United States Patent [19]
Chen et al.

[11] Patent Number: 6,055,164
[45] Date of Patent: *Apr. 25, 2000

[54] SYSTEM AND METHOD FOR ATTENUATING INDUCED EMI AND POWER CONVERTER EMPLOYING THE SAME

[75] Inventors: Qing Chen; Rui Liu, both of Plano, Tex.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/270,708

[22] Filed: Mar. 17, 1999

Related U.S. Application Data

[63] Continuation of application No. 08/969,891, Nov. 13, 1997, abandoned.

[51] Int. Cl.[7] ........................................ H02J 1/02
[52] U.S. Cl. ............................... 363/39; 363/47
[58] Field of Search ......................... 363/36, 39, 40, 363/44, 46, 47, 48, 144; 307/105

[56] References Cited

U.S. PATENT DOCUMENTS

| 5,184,291 | 2/1993 | Crowe et al. | 363/37 |
| 5,513,088 | 4/1996 | Williamson | 363/20 |
| 5,552,976 | 9/1996 | Munro et al. | 363/39 |
| 5,640,314 | 6/1997 | Glasband et al. | 363/36 |
| 5,742,103 | 4/1998 | Ashok | 307/105 |

*Primary Examiner*—Adolf Deneke Berhane

[57] ABSTRACT

An electromagnetic interference (EMI) filter, method of manufacturing therefor and power converter employing the EMI filter. In one embodiment, the EMI filter includes (1) a filter circuit board located outside a chassis and having an aperture that receives therethrough a bus bar extending from within the chassis, (2) a capacitor, mounted on the filter circuit board and coupled to the bus bar, that receives from the bus bar at least a portion of EMI induced into the bus bar from within the chassis and (3) a conductor, mounted on the filter circuit board and coupled between the capacitor and the chassis, that receives the portion from the capacitor and returns the portion to ground via the chassis.

15 Claims, 4 Drawing Sheets

SYSTEM AND METHOD FOR ATTENUATING INDUCED EMI AND POWER CONVERTER EMPLOYING THE SAME

This is a continuation of U.S. patent application Ser. No. 08/969,891, filed on Nov. 13, 1997, now abandoned entitled "SYSTEM AND METHOD FOR ATTENUATING INDUCED EMI AND POWER CONVERTER EMPLOYING THE SAME" to Chen, et al., which is herein incorporated by reference.

TECHNICAL FIELD OF THE INVENTION

The present invention is directed, in general, to power conversion and, more specifically, to a system and method for attenuating electromagnetic interference ("EMI") and a power converter employing the system or the method.

BACKGROUND OF THE INVENTION

The development of efficient, low noise, high density power converters is a continuing goal in the field of power electronics. A power converter is a power processing circuit that converts an input AC or DC voltage or current into a specified DC output voltage or current. Power converters are employed in many applications including telecommunications and computer systems wherein commercial AC voltages are converted to the DC voltages needed to operate the systems. Power converters, however, generally produce electromagnetic interference (EMI) noise.

In the United States, the Federal Communications Commission (FCC) has promulgated two different standards regarding the EMI that may be emitted by an electronic device. Consumer electronics must meet a stringent Class B emissions standard. Commercial products, on the other hand, are regulated under a less stringent Class A emissions standard. Telecommunications equipment is regulated as commercial products under FCC regulations. In the European market, for instance, telecommunications equipment must meet the stricter emissions standard for consumer products. Power converters, therefore, must be designed to meet not only domestic EMI regulatory requirements, but also various international regulations.

Switching mode power converters are typically packaged in a metal chassis to limit EMI emissions. EMI noise often escapes the power converter, however, by traveling through the output power conductor. An output EMI filter, placed on a printed wiring board (PWB), is typically used to filter the EMI noise on the output power conductor. For high power, high current power converters, however, the output interface is often composed of bus bars. Exhibiting lower conduction losses, the bus bars are thus integral to the design of high power and high density power converters. The bus bars, however, must typically attach to the PWB through long conduction paths. The output EMI filter mounted on the PWB is therefore less effective, since some EMI noise may couple directly to the output bus bars, thus bypassing the output EMI filter.

Accordingly, what is needed in the art is a system and method for filtering the EMI noise generated by the power converters, thereby allowing the power converters to meet not only domestic EMI regulatory requirements, but also various international regulations.

SUMMARY OF THE INVENTION

To address the above-discussed deficiencies of the prior art, the present invention provides, for use with a bus bar exiting a chassis containing EMI-generating electronic circuitry, a system for, and method of attenuating EMI induced into the bus bar by the electronic circuitry, including: (1) a filter circuit board, located without the chassis and proximate the bus bar, that contains a conductor for grounding the EMI and (2) a capacitor, mounted on the filter circuit board and coupled between the bus bar and the conductor, that conducts at least a portion of the EMI from the bus bar to the conductor.

The present invention therefore introduces the broad concept of locating at least a portion of a filter not within a chassis to allow the filter more effectively to attenuate EMI that may be induced into the bus bar. The chassis isolates the bus bar that is without (i.e., not within) the chassis from the electronic circuitry that is within the chassis, thereby preventing EMI from being added to the bus bar after filtering.

In one embodiment of the present invention, the system further includes a converter circuit board, located within the chassis, that provides a mount for the bus bar. Alternatively, separate conductors may convey current between the bus bar and the electronic circuitry.

In one embodiment of the present invention, the filter circuit board contains an aperture therethrough, the bus bar passing through the aperture. In one embodiment to be illustrated and described, the filter circuit board contains an aperture for each bus bar passing therethrough. Of course, the aperture is not required.

In one embodiment of the present invention, the conductor is coupled to the chassis. This allows the EMI to be grounded into the chassis. Alternatively, the EMI may be grounded to a location without the chassis.

In one embodiment of the present invention, the chassis shields the system from the electronic circuitry. This advantageously eliminates a need for extra shielding within the chassis. Of course, some applications may benefit from shielding separate from the chassis itself.

In one embodiment of the present invention, the chassis mechanically supports the filter circuit board. In the embodiment to be illustrated and described, the filter circuit board is mounted directly to a rear wall of the chassis.

In one embodiment of the present invention, the electronic circuitry is a power converter. Those skilled in the art are familiar with the structure and function of power converters, their ability to produce EMI at their outputs and the problems encountered in attempting to attenuate such EMI. Of course, the present invention may be employed with respect to any EMI-producing circuitry contained within a chassis.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
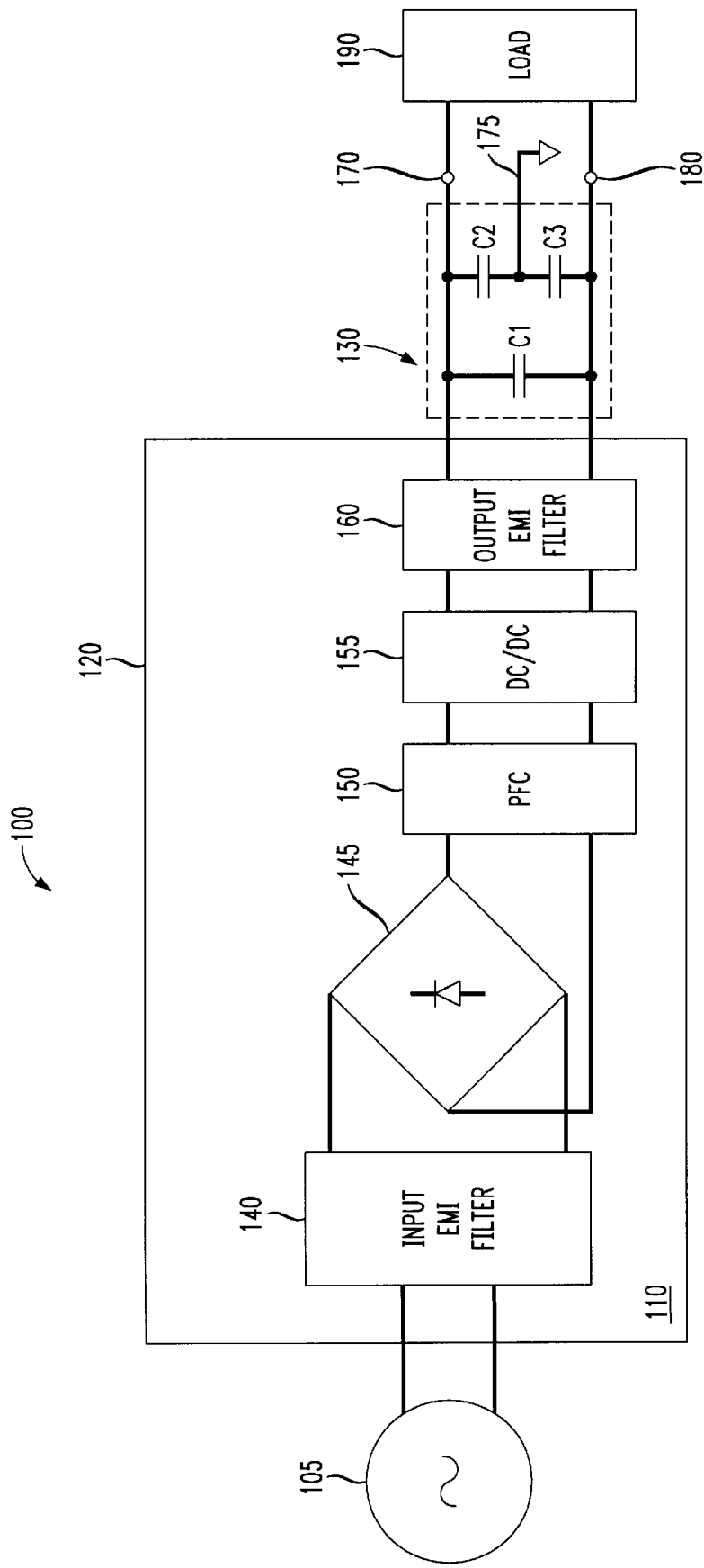
FIG. 1 illustrates a block diagram of an embodiment of a power converter constructed according to the principles of the present invention.

Referring initially to FIG. 1, illustrated is a block diagram of an embodiment of a power converter 100 constructed according to the principles of the present invention. The power converter 100 includes power converter electronic circuitry (power train) 110 mounted on a converter circuit board. The power converter 100 further includes a chassis 120, enclosing the converter circuit board. The chassis 120 assists in shielding EMI noise generated by the power train 110. The power converter 100 further includes an external filter 130, located without (not within) the chassis, for attenuating induced EMI. The power converter 100 still further includes elongated bus bars, mounted on the converter circuit board, that transmit output power from the power converter 100.

The power train 110 includes an input EMI filter 140 coupled to a source of AC power 105. The input EMI filter 140 reduces the EMI noise that is injected back to the source of AC power 105. The power train 110 further includes a rectifier 145, coupled to the EMI filter 140, that receives the AC power and provides therefrom rectified DC power. The power train 110 further includes a power factor correction circuit 150, coupled to the rectifier 145. The power factor correction circuit 150 converts the rectified DC power to a high DC voltage (e.g., 400 VDC). The power train 110 further includes a DC/DC converter 155, coupled to the power factor correction circuit 150, that scales the high DC voltage down to a lower DC voltage (e.g., 24 VDC) as required by a load 190. Both the power factor correction circuit 150 and the DC/DC converter 155 typically contain power switches that operate at high switching frequencies (e.g., 100 kHz), thereby generating EMI noise. The power train 110 still further includes an output EMI filter 160, coupled to the DC/DC converter 155. The output EMI filter 160 filters the EMI noise at an output of the power train 110. The input EMI filter 140, rectifier 145, power factor correction circuit 150, DC/DC converter 155, and output EMI filter 160 are well known in the art and, as a result, will not be described further.

The external filter 130 is coupled to the chassis 120 and is proximate to the bus bars. In the illustrated embodiment, the external filter 130 includes a filter circuit board containing a conductor, coupled to the chassis 120, for grounding the EMI noise. The external filter 130 further includes first, second and third capacitors C1, C2, C3. The first capacitor C1 is coupled between a positive output terminal 170 and a negative output terminal 180 of the power train 110. The second capacitor C2 is coupled between the positive output terminal 170 and a chassis ground 175. The third capacitor C3 is coupled between the negative output terminal 180 and the chassis ground 175. Although the illustrated embodiment contains high-frequency filter components such as capacitors, those skilled in the art will realize that the use of other filter components are well within the broad scope of the present invention. Furthermore, those skilled in the art understand that the external filter 130 may be incorporated into the chassis 120 and still be within the broad scope of the present invention. The high-frequency filter components of the external filter 130 reduces the EMI noise conducted through the positive and negative output terminals 170, 180, by conducting at least a portion of the EMI to the conductor. The power converter 100 may thus meet stringent international EMI emissions regulations.

Figure 2:
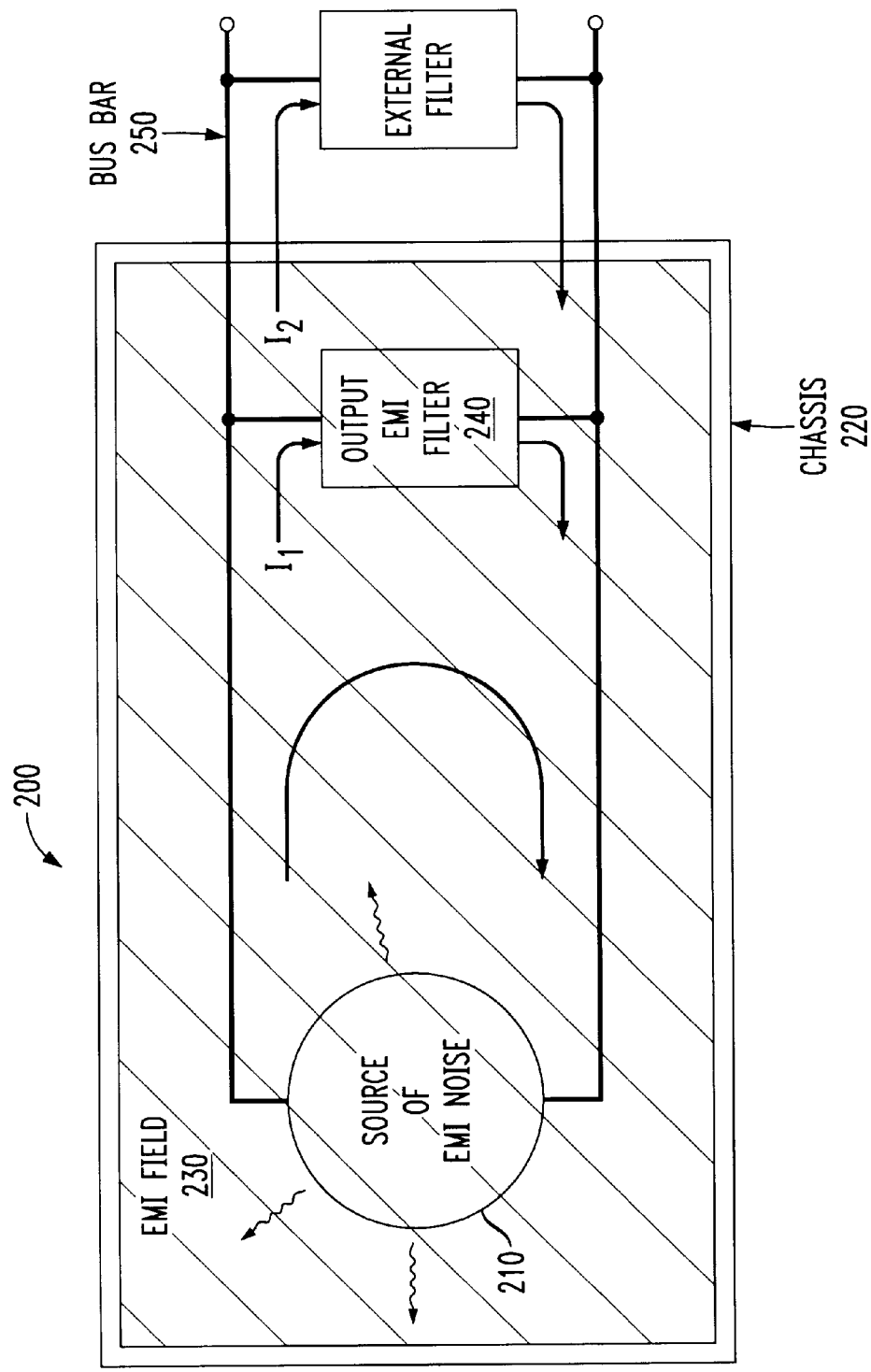
FIG. 2 illustrates a simplified block diagram of an embodiment of a power converter constructed according to the principles of the present invention.

Turning now to FIG. 2, illustrated is a simplified block diagram of an embodiment of a power converter 200 constructed according to the principles of the present invention. Switching devices within the power converter 200 are represented generally as a source of EMI noise 210 enclosed within a chassis 220. The source 210 generates both conducted EMI and radiated EMI. A strong EMI field 230 thus exists within the chassis 220. The power converter 200 contains an output EMI filter 240 that shunts a portion of the conducted EMI seeking to escape from the chassis 220. A first EMI current I1 traveling towards an output of the power converter 200 is redirected back towards the source 210 by the output EMI filter 240.

In the illustrated embodiment, power is conducted to an output of the power converter 200 via bus bars 250. The bus bars 250 exhibit low conduction losses, allowing the power converter 200 to be designed for high power, high current applications. Since the bus bars 250 are subject to receiving induced EMI, a second EMI current I2 may escape from the chassis 220 by conducting through the bus bars 250. An external filter 260, coupled between the bus bars 250, shunts and redirects at least a portion of the second EMI current I2 back into the chassis 220, thereby reducing an overall EMI emissions of the power converter 200. The external filter 260, in conjunction with the output EMI filter 240 thus provide the power converter 200 with a two-level filter (i.e., a board level filter and a chassis level filter).

Figure 3:
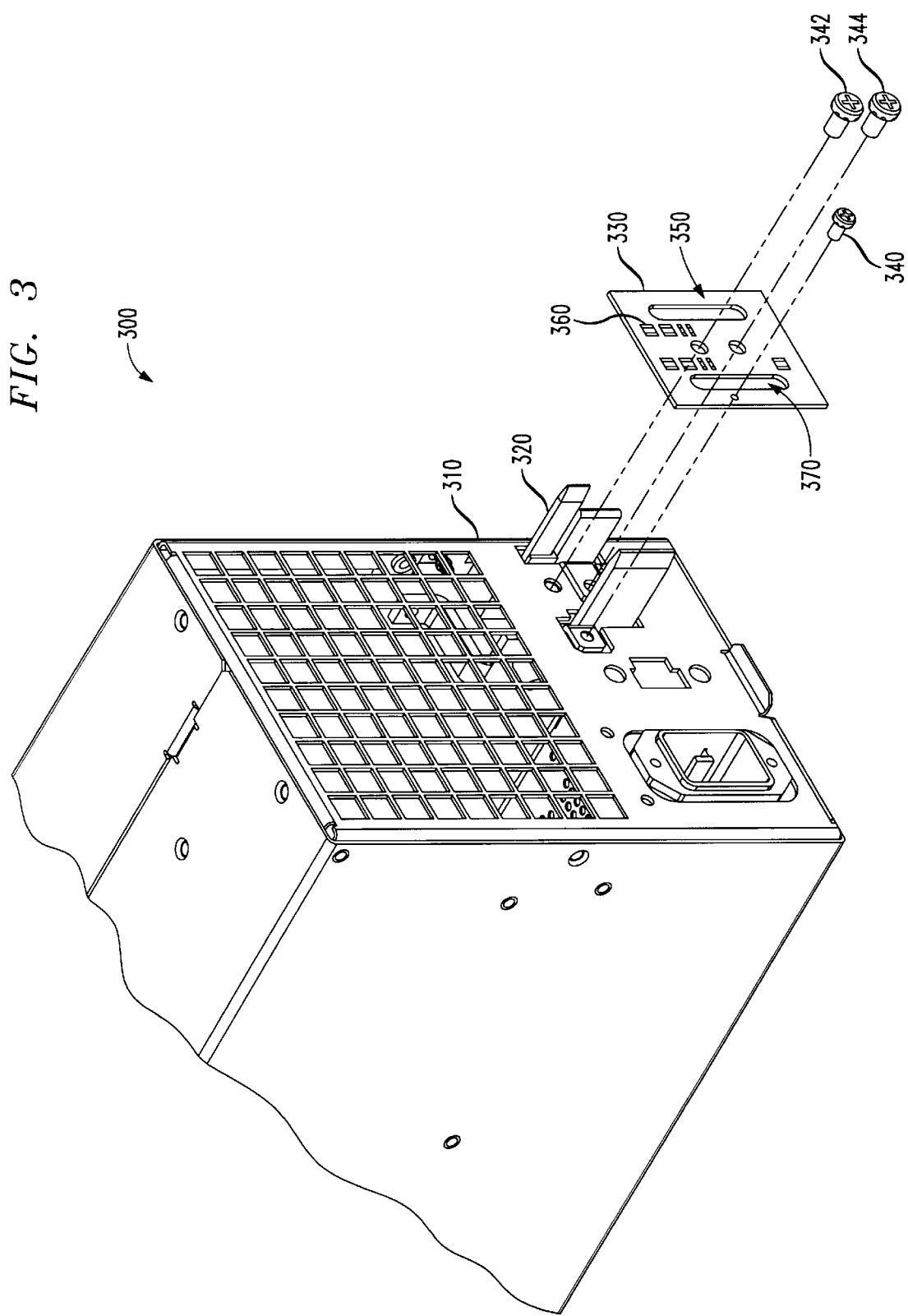
FIG. 3 illustrates an assembly view of an embodiment of a power converter constructed according to the principles of the present invention.

Turning now to FIG. 3, illustrated is an assembly view of an embodiment of a power converter 300 constructed according to the principles of the present invention. The power converter 300 is encased in a rack-mountable chassis 310. Elongated bus bars 320, mounted on a converter circuit board, extend from a rear wall of the chassis 310 to provide output power. In the illustrated embodiment, an external filter 330 is mounted to the chassis 310 by first, second, and third screws 340, 342, 344. Alternative methods of mechanically supporting the external filter 330 with the chassis 310 are well within the broad scope of the present invention. Of course, those skilled in the art will realize that mechanical support of the external filter 330 by the chassis 310 is not integral to the present invention. The external filter 330 is electrically coupled to the bus bars 320 and to earth ground (via the chassis 310).

The external filter 330 consists of a filter circuit board 350 and a plurality of filter components (one of which is labeled 360) mounted thereon. In the illustrated embodiment, the filter components 360 are surface-mount capacitors. Those skilled in the art will realize, of course, that the filter elements 360 are not limited to surface-mount capacitors and that other components, including through-hole devices, may also be used. Additionally, the filter circuit board 350 contains a plurality of apertures (one of which is labeled 370), through which the bus bars 320 extend respectively. The external filter 330 may thus be mounted directly onto the chassis 310. Alternatively, the external filter 330 may be integrated with the chassis. The bus bars 320 pass through the filter circuit board 350, providing filtered power to a load (not shown).

Figure 4:
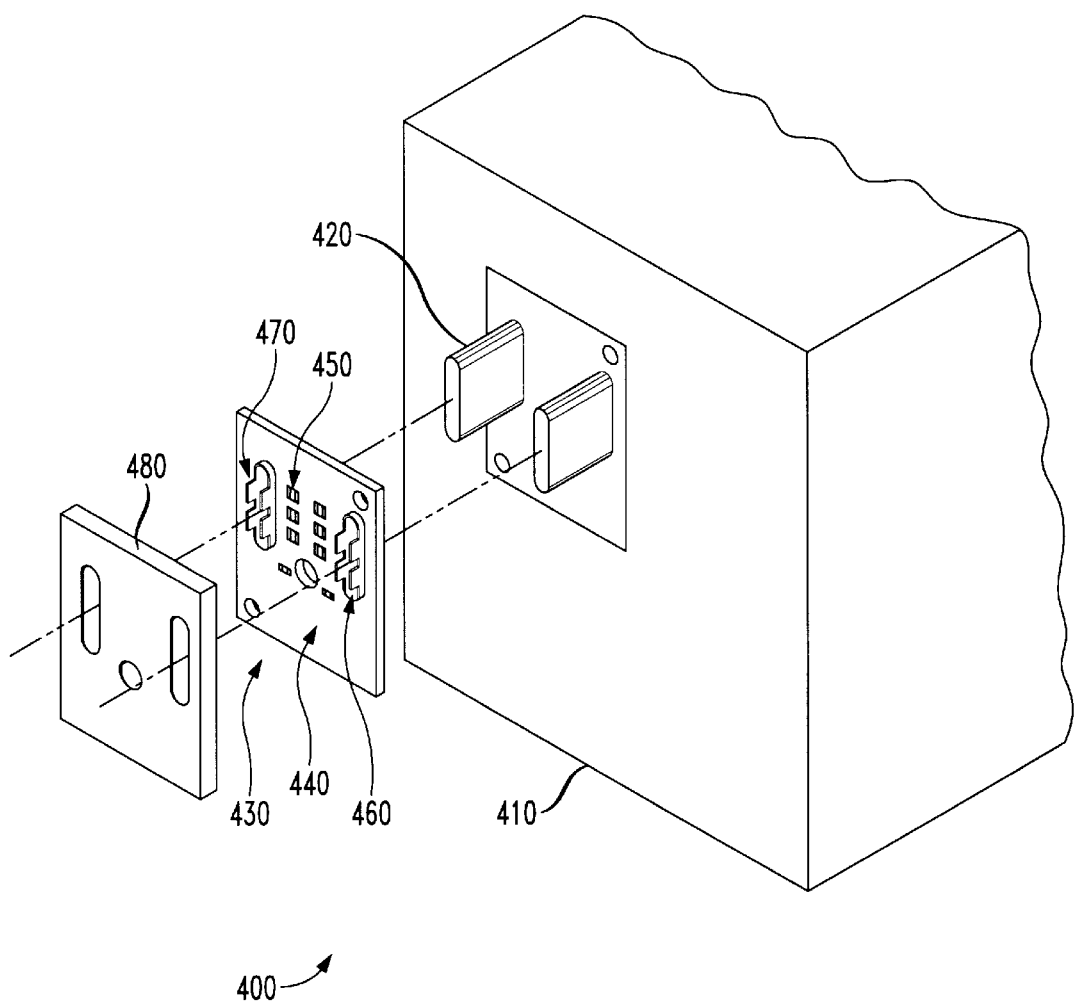
FIG. 4 illustrates an assembly view of another embodiment of a power converter constructed according to the principles of the present invention.

Turning finally to FIG. 4, illustrated is an assembly view of another embodiment of a power converter 400 constructed according to the principles of the present invention. The power converter 400 is encased within a chassis 410. Bus bars 420 extend from the chassis 410 to provide power output from the power converter 400 to a load (not shown).

The external filter 430 consists of a filter circuit board 440 and a plurality of filter components 450 (e.g., capacitors) mounted thereon. Of course, other filter elements may also be used. The filter circuit board 440 contains apertures 460, that enable the external filter 430 to be mounted directly to the chassis 410. The bus bars 420 thus pass through the apertures 460 of the filter circuit board 440. Fingers 470, mounted on the filter circuit board 440 apply pressure and provide further mechanical support to the bus bars 420 and the filter circuit board 440. Additionally, the external filter 430 includes a cover plate 480 that provides protection to the external filter 430.

Although the present invention has been described in detail, those skilled in the art should understand that they can make various changes, substitutions and alterations herein without departing from the spirit and scope of the invention in its broadest form.

What is claimed is:

1. An electromagnetic interference (EMI) filter, comprising:
   a filter circuit board mounted to an external face of an exterior wall of a chassis and having an aperture that receives therethrough a bus bar extending from within said chassis;
   a capacitor, mounted on said filter circuit board and coupled to said bus bar, that receives from said bus bar at least a portion of EMI induced into said bus bar, and inadequately filtered, within said chassis; and
   a conductor, mounted on said filter circuit board and coupled between said capacitor and said chassis, that receives said portion from said capacitor and returns said portion to ground via said chassis.

2. The EMI filter as recited in claim 1 further comprising a converter circuit board, located within said chassis, that provides a mount for said bus bar.

3. The EMI filter as recited in claim 1 wherein said chassis shields said filter circuit board from at least a portion of EMI generated by electronic circuitry contained within said chassis.

4. The EMI filter as recited in claim 1 wherein said chassis mechanically supports said filter circuit board.

5. The EMI filter as recited in claim 3 wherein said electronic circuitry is a power converter.

6. A method of manufacturing an electromagnetic interference (EMI) filter, comprising:
   mounting a filter circuit board to an external face of an exterior wall of a chassis, said filter circuit board having an aperture that receives therethrough a bus bar extending from within said chassis;
   coupling a capacitor, mounted on said filter circuit board, to said bus bar, said capacitor receiving from said bus bar at least a portion of EMI induced into said bus bar, and inadequately filtered, within said chassis; and
   providing a conductor on said filter circuit board, coupled between said capacitor and said chassis, that receives said portion from said capacitor and returns said portion to ground via said chassis.

7. The method as recited in claim 6 further comprising mounting said bus bar to a converter circuit board located within said chassis.

8. The method as recited in claim 6 wherein said chassis shields said filter circuit board from at least a portion of EMI generated by electronic circuitry contained within said chassis.

9. The method as recited in claim 6 wherein said mounting comprises mechanically supporting said filter circuit board with said chassis.

10. The method as recited in claim 8 wherein said electronic circuitry is a power converter.

11. A power converter, comprising:
   a chassis;
   a converter circuit board located within said chassis;
   power converter electronic circuitry mounted on said converter circuit board;
   elongated bus bars, mounted on said converter circuit board and extending outside said chassis, that transmit output power from said power converter electronic circuitry and are subject to receiving induced electromagnetic interference (EMI) from said power converter electronic circuitry, said induced EMI inadequately filtered within said chassis; and
   an EMI filter, including:
      a filter circuit board, mounted to an external face of an exterior wall of said chassis and having apertures that receive therethrough respective bus bars,
      capacitors, mounted on said filter circuit board and coupled to said bus bars, that receive from said bus bars at least a portion of said induced EMI, and
      a conductor, mounted on said filter circuit board and coupled between one of said capacitors and said chassis, that receives said portion from said one of said capacitors and returns said portion to ground via said chassis.

12. The power converter as recited in claim 11 further comprising an internal EMI filter mounted to said converter circuit board.

13. The power converter as recited in claim 11 wherein said bus bar extend from a rear wall of said chassis, said chassis being rack-mountable.

14. The power converter as recited in claim 11 wherein said chassis shields said filter circuit board from at least a portion of EMI generated by said power converter electronic circuitry.

15. The power converter as recited in claim 11 wherein said chassis mechanically supports said filter circuit board.

* * * * *